United States Patent [19]

Jenkins

[11] Patent Number: 4,947,352

[45] Date of Patent: Aug. 7, 1990

[54] TEMPERATURE COMPENSATION IN DIFFERENTIAL PRESSURE LEAK DETECTION

[75] Inventor: Anthony Jenkins, Fowlmere, England

[73] Assignee: Ion Track Instruments, Inc., Burlington, Mass.

[21] Appl. No.: 173,077

[22] Filed: Mar. 25, 1988

[30] Foreign Application Priority Data

Mar. 26, 1987 [GB] United Kingdom ................. 8707231

[51] Int. Cl.$^5$ ..................... G06F 15/32; G01M 3/32; G01K 13/00
[52] U.S. Cl. ...................................... 364/558; 73/52; 374/4; 364/557
[58] Field of Search ............... 364/557, 558, 579, 580; 73/37.6, 40.5 R, 40.9, 45.1, 49.2, 49.3, 52

[56] References Cited

U.S. PATENT DOCUMENTS

| | | | |
|---|---|---|---|
| 3,987,664 | 10/1976 | Hass et al. | 73/49.2 |
| 4,468,968 | 9/1984 | Kee | 364/558 |
| 4,675,834 | 6/1987 | Furuse | 364/558 |

OTHER PUBLICATIONS

Korn and Korn: Electronic Analog Computers (Textbook), McGraw-Hill 1956, pp. 395-406 of interest.

"Model 102 Qualitek", brochure-ITI Industrial-4-page brochure.
"Qualitek 102-2 User Manual"-Compiled: D. Morris, R. Guy-11/86-44 pages.

Primary Examiner—Felix D. Gruber
Attorney, Agent, or Firm—Anthony J. Casella; Gerald E. Hespos

[57] ABSTRACT

A microprocessor is employed to control a test program which operates to cause a component under test to be filled (or evacuated) to a predetermined pressure $P_2$ at which a leak test is to be carried out. The test program is arranged firstly to perform a rapid test at atmospheric pressure $P_1$ to determine the pressure change $dp1'/dt$ in the component due to the temperature fluctuation. The component is then filled (or evacuated) automatically to the test pressure $P_T$, at which the leak check is carried out. Temperature compensation is achieved by subtracting the value of C $dpl'/dt$ from the pressure change $dp_t/dt$ actually measured, i.e. the actual leak rate $dPL/dt$ is given by $$\frac{d_{pL}}{dt} = \frac{dP_T}{dt} - C\frac{dp'}{dt}$$

where the constant, C, is generated from an identical proram run, the calibration run, on a known non-leaker with a high temperature fluctuation.

4 Claims, 2 Drawing Sheets

TEMPERATURE COMPENSATION IN DIFFERENTIAL PRESSURE LEAK DETECTION

BACKGROUND OF THE INVENTION

The present invention is concerned with a method and apparatus for temperature compensation in differential pressure leak detection.

Many components produced by the manufacturing industry are checked for gas leaks by a method known as "pressure drop". The method entails filling the component with a gas (usually air) to the working pressure of the component. The supply is then switched off and the pressure is monitored. If the pressure falls then a leak is indicated.

The relationship between pressure fall and leakrate is derived from Boyles law according to which, for a fixed mass of gas:

$$\xi pv = \text{constant} \tag{1}$$

For a vessel of volume v filled to pressure, p bar, with a leak, $\Delta v$, measured at atmospheric pressure, (1 bar), then from Boyles law, $$pv = (p + \Delta p)v + 1\Delta v \tag{2}$$

where $\Delta p$ is the pressure change. Then $$0 = \Delta pv + \Delta v \tag{3}$$

The rate of pressure change dp/dt is given by $$\frac{dp}{dt} = -\frac{1}{v} \frac{dv}{dt}$$

where dv/dt is the volumetric flowrate measured at atmosphere pressure 1(bar)

Thus, the rate of fall of pressure can be used as a measure of the volumetric leak from the component.

Unfortunately, however, temperature fluctuations have a similar effect on pressure within the vessel. Thus, for a mole of gas, the gas laws state that $$pv = R\theta \tag{5}$$

where R is the gas constant and $\theta$ is the temperature. In changing conditions, $$\frac{Pdv}{dt} + \frac{vdp}{dt} = \frac{Rd\theta}{dt} \tag{6}$$

If the rate of change of volume of the component is ignored, then to a first approximation $$\frac{dp}{dt} = \frac{R}{v} \frac{d\theta}{dt} \tag{7}$$

substituting from (5) gives $$\frac{dp}{dt} = \frac{p}{\theta} \frac{d\theta}{dt} \tag{8}$$

For any fixed mass of gas with only very small temperature fluctuation during the test, then equation (8) to a first approximation becomes.

$$\frac{dp}{dt} = K \cdot p \frac{d\theta}{dt} \tag{9}$$

In practice, the relationship between rate of change of pressure due to a fixed rate of change of temperature and the actual pressure in the vessel can be more nearly described by the second order equation:

$$\frac{dp}{dt} = \frac{Kd\theta}{dt} (p + ap^2) \tag{10}$$

where a and K are constants.

In a real test situation, it is therefore impossible to tell whether a measured pressure change is due to a small leak or to a small temperature fluctuation, or both.

SUMMARY OF THE INVENTION

It is an object of the present invention to provide a method by which compensation for temperature fluctuations can be achieved so as to obtain an accurate measure of actual leakrate.

As stated above, in a real test situation, it is not possible to tell whether the measured pressure change is due to a small leak or to a small temperature fluctuation. Temperature changes as small as one ten thousandth of a degree Kelvin will affect the measurement. However, when the vessel is filled with air to atmospheric pressure and sealed, then any pressure fluctuation occurring is entirely due to temperature fluctuation since no leak will be present.

In a crude system it would be sufficient to measure the pressure fluctuation in a pre-test at atmospheric pressure (1 bar) then extrapolate this to the filling pressure, $P_2$ bar in equation (9). i.e. at 1 bar $$\frac{dp_1}{dt} = \frac{Kd\theta}{dt}$$

At $P_2$ bar, the predicted pressure fluctuation due to temperature change would be:

$$\frac{dp_2}{dt} = \frac{dp_1}{dt} \cdot p_2 \tag{11}$$

Suppose however, that the pressure changes due to a combination of temperature change and leakrate, then the leak contribution, $dp_L/dt$ is given by $$\frac{dp_L}{dt} = \frac{dp}{dt} - \frac{dp_2}{dt} \tag{12}$$

where dp/dt is the measured pressure differential.

Thus, in the crude system temperature compensation could be achieved by inserting the results of equation (11) in (12).

$$\text{i.e. } \frac{dp_L}{dt} = \frac{dp}{dt} - \frac{dp_1}{dt} \cdot p_2 \tag{13}$$

A more accurate compensation is achieved, however, by employing the more accurate relationship described by equation (10). In this case, a known, non-leaking vessel subjected to a significant rate of change of temperature must first be tested. Using a non-leaker, a test is first made at 1 bar absolute followed by a test at the required test pressure $p_2$. Then, at $p=1$, equation (10) gives $$\frac{dp}{dt} = \frac{Kd\theta}{dt}(1 + a) \quad (14)$$

and at $P_2$, $$\frac{dp_2}{dt} = \frac{Kd\theta}{dt}(p_2 + ap_2^2) \quad (15)$$

From these two equations, the constant 'a' can be shown to be given by $$a = \frac{p_2\frac{dp_1}{dt} - \frac{dp_2}{dt}}{\frac{dp_2}{dt} - p_2^2\frac{dp_1}{dt}} \quad (16)$$

If an unknown component is first tested at atmospheric pressure, the measured rate of change of pressure $dp_1'/dt$ relates to a new temperature rate of change $d\theta'/dt$ as described in equation (14)

i.e. $\frac{dp_1'}{dt} = \frac{Kd\theta'}{dt}(1 + a) \quad (17)$ and similarly at pressure $P_2$, $$\frac{dp_2'}{dt} = \frac{Kd\theta'}{dt}(p_2 + ap_2^2) \quad (18)$$

Substituting for $Kd\theta'/dt$ from (17)

$$\frac{dp_2'}{dt} = \frac{dp_1'}{dt} \cdot \frac{p_2}{(1 + a)} \cdot (1 + ap_2) \quad (19)$$

Substituting for 'a' from equation (16) gives:

$$\frac{dp_2'}{dt} = \frac{\frac{dp_2}{dt} \cdot \frac{dp_1'}{dt}}{\frac{dp_1}{dt}} \quad (20)$$

The measured values of $dp^1/dt$ and $dp_2/dt$ can then be used to compute C, so that $$\frac{dp_2'}{dt} = C\frac{dp_1'}{dt} \quad (21)$$

(this expression holding true only at the two pressures $p_1$ and $p_2$). Substituting in equation (12) gives $$\frac{dp_L}{dt} = \frac{dp}{dt} - \frac{Cdp_1'}{dt} \quad (22)$$

where
$dPL/dt$ is the required measure of actual leakrate
$dp/dt$ is the measured pressure change at the test pressure $P_2$.
C is calculated from the ratio $$\frac{dp_2}{dt} \cdot \frac{dp_1}{dt},$$

and $dp1'/dt$ is the measured pressure change at atmospheric pressure.

Thus, in accordance with the present invention, there is provided a method of differential pressure leak detection comprising the steps of:

(a) measuring and storing the rates of change of pressure in a known non-leaking vessel at an elevated or depressed and changing temperature from ambient, both at atmospheric pressure $P_1$ to obtain $dp_1/dt$ and at a test pressure $P_2$ to obtain $dp_2/dt$;

(b) computing the ratio $$C = \frac{dp_2}{dt} \cdot \frac{dp_1}{dt}$$

using the stored values of $dp_2/dt$ and $dp_1/dt$;

(c) measuring the rate of change of pressure $(dP_1'/dt)$ at atmospheric pressure in an unknown vessel under test;

(d) measuring the rate of change of pressure $(dP_T/dt)$ in the test vessel at the test pressure $P_T$; and (e) subtracting from the measured pressure change $(dP_T/dt)$ the result of multiplying the measured value of $(dp_1'/dt)$ from (c) by the computed value of C from (b).

DETAILED DESCRIPTION OF THE PREFERRED EMBODIMENTS

In an illustrated embodiment of the invention, a microprocessor is employed to control the test programme and operates to cause the component under test to be filled (or evacuated) to a predetermined pressure $P_T$ at which the leak test is to be carried out. The test programme is preferably arranged firstly to perform a rapid test at atmospheric pressure $P_1$ to determined the pressure change $dp1'/dt$ due to the temperature fluctuation. The component is then filled (or evacuated) automatically to the test pressure $P_T$, at which the leak check is carried out. The apparatus used for filling the components, and measuring the pressure change rates is itself conventional.

Figure 1:
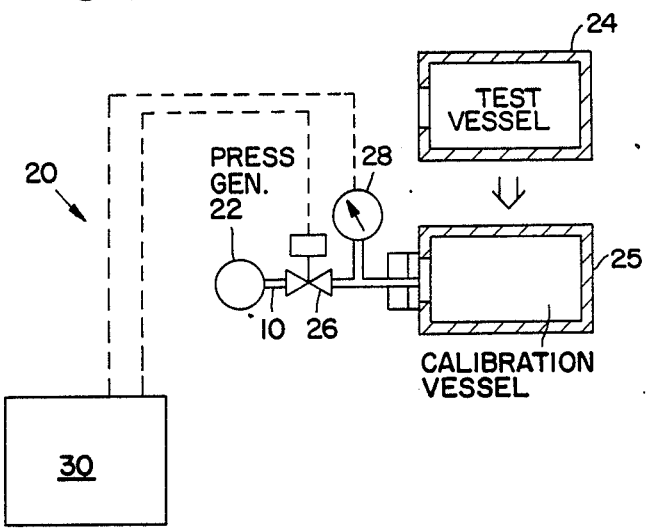
FIG. 1 is a schematic illustration of the computing means of the subject invention incorporated into a controlling system of a known pressure measurement means in a first operational condition.
Figure 2:
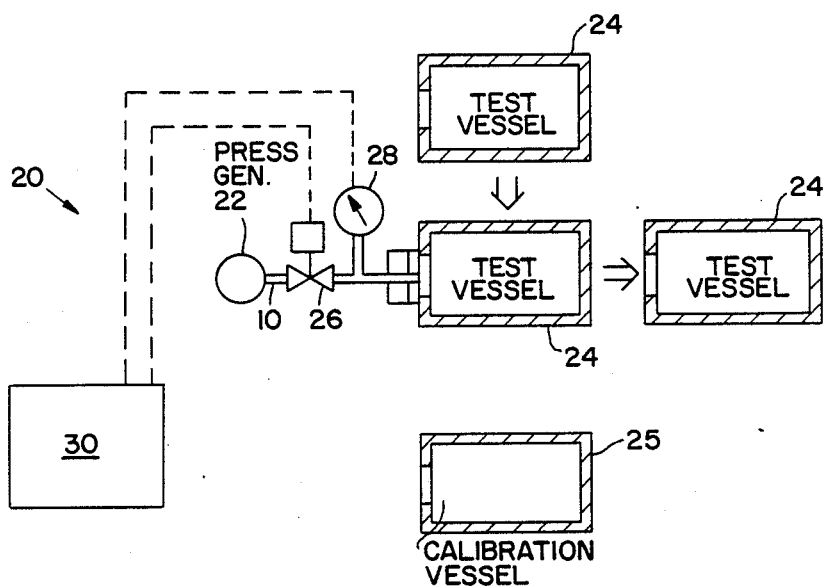
FIG. 2 is a schematic illustration similar to FIG. 1 but showing the system in a second operational condition.
Figure 3:
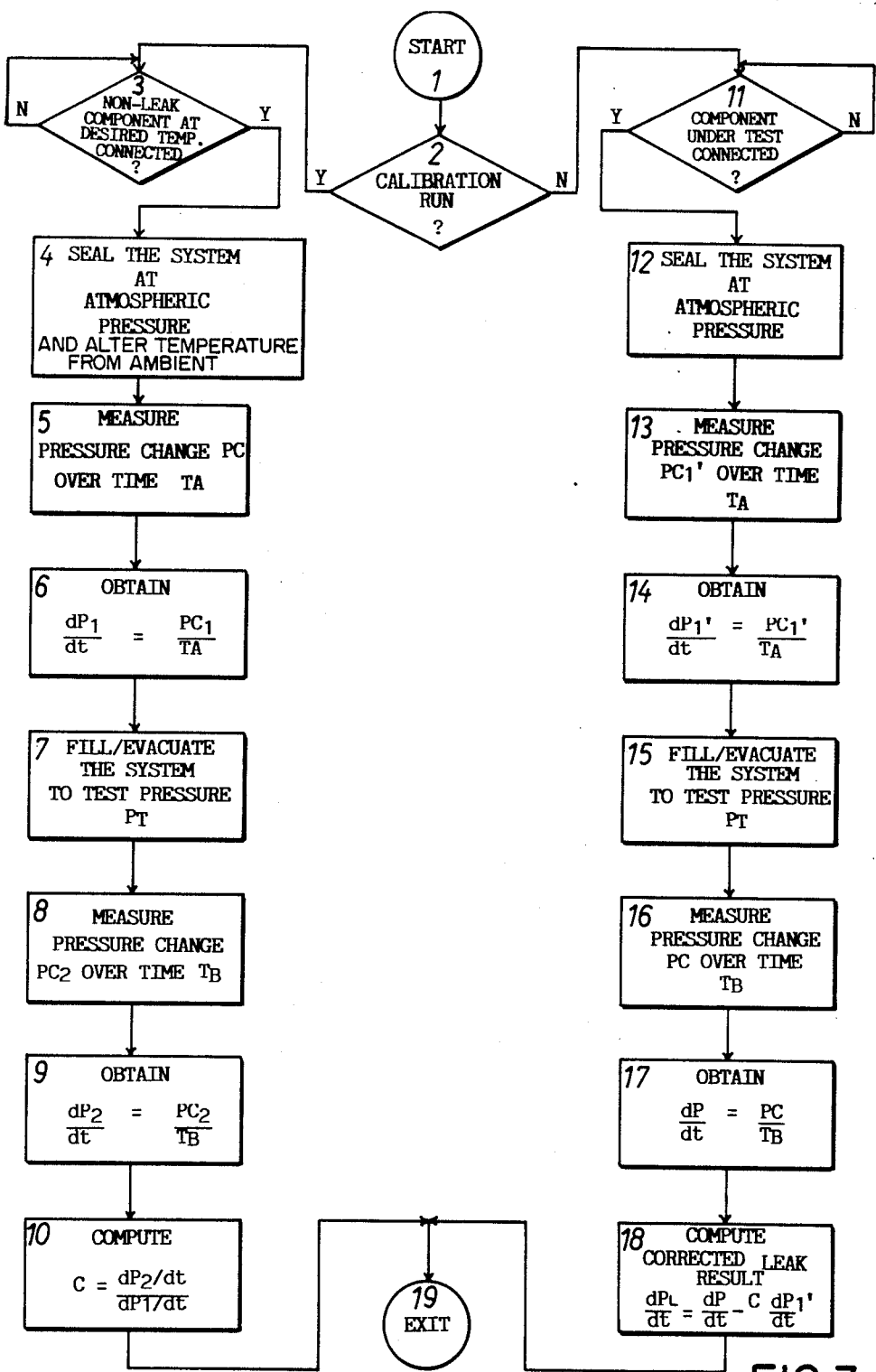
FIG. 3 is a flow diagram illustrating one practical embodiment of the method of the subject invention.

More particularly, FIGS. 1 and 2 show a typical known pressure measurement system that may be employed with a microprocessor or other computing means to practice the subject invention. In this regard, FIGS. 1 and 2 show a leakage inspection system which is a simplification of a system identified as prior art in U.S. Pat. No. 4,675,834. This system, as depicted in FIGS. 1 and 2 is identified generally by the numeral 20 and includes a pressure generator 22 which is selectively placed in communication with either a vessel 24 under test or a calibration vessel 25. A valve means 26 is disposed intermediate the pressure generator 22 and the vessel under test 24 or the calibration vessel 25 for selectively sealing the appropriate vessel 24, 25. A pressure sensing means 28 is in communication with the vessel under test 24 or the calibration vessel 25 intermediate the valve means 26 and the appropriate vessel 24 or 25. The microprocessor or other computing means in accordance with the subject invention is identified generally by the numeral 30 and is operatively connected to the pressure sensing means 28 and the valve means 26 for generating and storing signals corresponding to rates of change of pressure in the vessel under test 24 as explained above and further herein. FIG. 1 shows the calibration vessel 25 connected to the system 20 for performing a calibration of the system 20. In FIG. 1, the vessels 24 to be tested are in an off line location. FIG. 2 shows one of the vessels 24 connected to the system 20 for testing. In FIG. 2, the calibration vessel 25 is in an off line location, but remains available for periodic calibration of the system. The operation of the microprocessor or computing means 30 is described in greater detail below and is illustrated schematically in the flow diagram of FIG. 3. Temperature compensation is achieved by the microprocessor subtracting the result of the calculation given in equation (21) above from the pressure change $dP_T/dt$ actually measured, i.e. the actual leak rate $dpL/dt$ is given by $$\frac{dpL}{dt} = dp_T/dt - C\frac{dp_1'}{dt}$$

The constant, C, is generated from an identical programme run, the calibration run, on a known non-leaker with a high temperature fluctuation. Thus, all programme times and pressure are identical between the calibration and normal test runs.

Referring to the illustrated flow diagram, the steps controlled by the microcomputer are as follows, the following step numbers corresponding to the numbers given to each of the respective operational steps in the flow diagram=

(1) A test run is initalled by operating a "start" control.

(2) If a "calibration run" is to be performed, the test proceeds to step (3). If a test run on a test component is to be performed, the test proceeds to step (11), (see below).

(3) If a non-leaker component has been connected and a desired temperature condition prevails, then the calibration run proceeds to step (4).

(4) The system is sealed at atmospheric pressure and temperature is altered from ambient.

(5) A measure is made of the pressure change $PC_1$ over time $T_A$.

(6) $dP_1/dt = PC_1/T_A$ is obtained and stored.

(7) The system is filled (or evacuated) to a predetermined test pressure $P_2$.

(8) A measure is made of the pressure change $PC_2$ over time $T_B$ (normally again at the said desired temperature).

(9) $dP_2/dt = PC_2/T_B$ is obtained and stored.

(10) The ratio $$\frac{dp_2}{dt} / \frac{dp_1}{dt} = C$$

is calculated from the stored values from steps (6) and (9) in order to calculate C, which is then stored.

(11) If a test component has been connected, then the test run proceeds to step (12).

(12) The system is sealed at atmospheric pressure.

(13) A measure is made of the pressure change $PC_1'$ over time $T_A$.

(14) $dP_1'/dt = PC_1'/T_A$ is obtained and stored.

(15) The system is filled (or evacuated) to a predetermined test pressure $P_T$.

(16) A measure is made of the pressure change PC over time $T_B$ (normally at the same temperature as step (13).

(17) $dp_T/dt = PC/T_B$ is obtained and stored.

(18) The value of C from step (10) is multiplied by $dp_1'/dt$ from step (14) and subtracted from $dp_T/dt$ from step (17) to compute the corrected leak rate result $dpL/dt$ from:

$$\frac{dpL}{dt} = dp_T/dt - C\frac{dp_1'}{dt}.$$

It will be evident that the described method relies on the fact that the temperature of the test and calibration components is changing during measurement and thus giving rise to effective pressure changes. However, since the calculations involve taking ratios involving the rate of change of temperature, then the actual value of the rate of change of temperature does not matter, so long as it is substantially the same for the two test measurements, i.e. at one bar and at the test pressure.

Hence, it is necessary to take the pressure readings as quickly as possible, since most components obey Newton's law of cooling, i.e. an exponential change and therefore one having a varying rate of change.

In practice, it does not matter whether the component under test is heating or cooling, but its temperature must be changing. The actual temperature and the rate of change of temperature can be different for the calibration and the test run, as will be appreciated from the equations.

Since the effects of temperature can be small, in order to achieve good accuracy in the calculations it is preferred to perform the calibration run on as high a temperature as possible (or as low) since the rate of change is then highest. This reduces the error in the constant C when computed by a digital system.

In practice the calibration component could be deliberately raised or lowered in temperature (for example by an oven or fridge) and then allowed to cool/warm, but typically the test components are already hot/cold (and therefore cooling/warming) due to the environment of the manufacturing process through which they have been.

Thus, the present method enables accurate compensation to be made in leak tests for the effects of temperature variations on the measured pressure changes.

I claim:

1. A method for accurately determining the actual leak rate from a test vessel of unknown leaking characteristics, said method comprising the steps of:
   providing a calibration vessel known to be substantially free of leaks;
   filling the calibration vessel with air to prevailing atmospheric pressure, $P_1$;
   altering the temperature in the calibration vessel from ambient temperature;
   sealing the calibration vessel;
   generating and storing a signal corresponding to the rate of change of pressure in the calibration vessel to determine $dP_1/dt$;
   altering the volume of air in the calibration vessel to achieve a test pressure $P_2$, which is different from $P_1$;

sealing the calibration vessel;

generating and storing a signal corresponding to the rate of change of pressure in the calibration vessel to determine $(dP_2/dt)$;

computing a ratio, C, of $(dP_2/dt)$ divided by $(dP_1/dt)$;

filling the test vessel with air to prevailing atmospheric pressure $P_1$;

sealing the test vessel;

generating and storing a signal corresponding to the rate of change of pressure in the test vessel to determine $(dP_1/dt)'$;

altering the volume of air in the test vessel to achieve the test pressure $P_T$;

generating and storing a signal corresponding to the rate of change of pressure in the test vessel to determine $(dP_T/dt)$; and generating a signal corresponding to the actual leak rate from the test vessel by subtracting from the measured rate of pressure change $(dP_T/dt)$ the product of the ratio C multiplied by the measured rate of pressure change $(dP_1/dt)'$.

2. A method as in claim 1 for accurately determining the actual leak rate from a plurality of test vessels wherein the steps of filling the test vessel with air to prevailing atmospheric pressure, sealing the test vessel, generating and storing a signal corresponding to the rate of change of pressure in the test vessel to determine $(DP_1/Dt)'$, altering the volume of air in the test vessel to achieve a test pressure $P_T$, and generating and storing a signal corresponding to the rate of change of pressure in the test vessel to determine $(DP_T/Dt)'$ are repeated sequentially for each of said test vessels and wherein the method further includes the steps of generating signals corresponding to the actual leak rate from each of the test vessels by subtracting from the measured rate of pressure change $(DP_T/Dt)'$ for each of said test vessels the product of the ratio C multiplied by the measured rate of pressure change $(DP_1/Dt)'$.

3. A method as in claim 1 wherein the step of altering the volume of air in the test vessel is carried out automatically after the step of generating and storing a signal corresponding to the rate of change of pressure in the test vessel to determine $(DP_1/Dt)'$.

4. A method as in claim 1 wherein the test pressure $P_2$ is approximately equal to the test pressure $P_T$.

* * * * *